US008285079B2

(12) United States Patent
Robertson et al.

(10) Patent No.: US 8,285,079 B2
(45) Date of Patent: Oct. 9, 2012

(54) METHOD FOR HIGHLY ACCURATE ESTIMATION OF MOTION USING PHASE CORRELATION

(75) Inventors: Mark A Robertson, Cupertino, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/728,025

(22) Filed: Mar. 19, 2010

(65) Prior Publication Data
US 2011/0229056 A1 Sep. 22, 2011

(51) Int. Cl.
*G06K 9/32* (2006.01)

(52) U.S. Cl. ......................................... 382/294

(58) Field of Classification Search ................. 382/260, 382/278, 294, 305, 312; 375/240.16; 345/677; 358/412
See application file for complete search history.

(56) References Cited

U.S. PATENT DOCUMENTS

| | | | |
|---|---|---|---|
| 5,005,078 A * | 4/1991 | Gillard | 348/452 |
| 5,557,684 A | 9/1996 | Wang et al. | |
| 5,635,994 A | 6/1997 | Drexler et al. | |
| 5,642,166 A | 6/1997 | Shin et al. | |
| 5,682,205 A * | 10/1997 | Sezan et al. | 348/452 |
| 5,717,470 A | 2/1998 | Jung | |
| 5,818,969 A | 10/1998 | Astle | |
| 5,940,145 A * | 8/1999 | Burl | 348/699 |
| 6,057,892 A * | 5/2000 | Borer | 348/699 |
| 6,075,818 A * | 6/2000 | Thomson | 375/240 |
| 6,278,736 B1 | 8/2001 | De Haan et al. | |
| 6,385,245 B1 | 5/2002 | De Haan et al. | |
| 6,418,166 B1 | 7/2002 | Wu et al. | |
| 6,473,462 B1 | 10/2002 | Chevance et al. | |
| 6,658,059 B1 | 12/2003 | Lu et al. | |
| 7,170,934 B2 | 1/2007 | Linzer | |
| 7,260,148 B2 | 8/2007 | Sohm | |
| 7,349,583 B2 * | 3/2008 | Kumar et al. | 382/294 |
| 7,620,269 B1 * | 11/2009 | Nandy | 382/294 |
| 7,751,482 B1 * | 7/2010 | Srinivasan et al. | 375/240.16 |

(Continued)

FOREIGN PATENT DOCUMENTS

EP 0720382 B1 7/1996

(Continued)

OTHER PUBLICATIONS

Su et al., "Robust Global Motion Estimation From Coarsely Sampled Motion Vector Fields;" Proceedings of SPIE, vol. 5022, pp. 98-101, Published Jun. 30, 2003.

(Continued)

*Primary Examiner* — Kanjibhai Patel
(74) *Attorney, Agent, or Firm* — Haverstock & Owens LLP

(57) ABSTRACT

An image alignment method includes computationally efficient methods of achieving high-accuracy local motion estimates by using phase correlation. The method also estimates motion reliability that allows a generic robust model fitting algorithm to produce more accurate results while operating much more efficiently. One of three methods are used to determine sub-pel motion estimation with improved accuracy. Each of the sub-pel motion estimation methods uses phase correlation, and are based on fitting computationally efficient 2-D quadratic surfaces to a phase correlation surface. A pre-filter is applied which shapes the phase correlation surface to enable appropriate fitting to the quadratic surface. Bias is also compensated for prior to applying a sub-pel motion estimation method. The method also estimates the reliability of the sub-pel motion estimates determined using phase correlation.

36 Claims, 9 Drawing Sheets

U.S. PATENT DOCUMENTS

| | | | |
|---|---|---|---|
| 8,155,452 | B2 * | 4/2012 | Minear ...................... 382/218 |
| 2005/0025342 | A1 | 2/2005 | Lee et al. |
| 2005/0094852 | A1 | 5/2005 | Kumar et al. |
| 2005/0105618 | A1 | 5/2005 | Booth et al. |
| 2005/0135484 | A1 | 6/2005 | Lee et al. |
| 2005/0242568 | A1 | 11/2005 | Long et al. |
| 2005/0243921 | A1 | 11/2005 | Au et al. |
| 2005/0270486 | A1 | 12/2005 | Teiwes et al. |
| 2006/0056513 | A1 | 3/2006 | Shen et al. |
| 2006/0056708 | A1 | 3/2006 | Shen et al. |
| 2006/0083407 | A1 | 4/2006 | Zimmermann et al. |
| 2006/0280248 | A1 | 12/2006 | Kim et al. |
| 2007/0092006 | A1 | 4/2007 | Malayath |
| 2007/0121728 | A1 | 5/2007 | Wang et al. |
| 2007/0154103 | A1 | 7/2007 | Au et al. |
| 2007/0183504 | A1 | 8/2007 | Hoffman et al. |
| 2007/0217515 | A1 | 9/2007 | Wang et al. |
| 2007/0286286 | A1 | 12/2007 | Heng et al. |
| 2007/0297512 | A1 | 12/2007 | Lee et al. |
| 2008/0019611 | A1 | 1/2008 | Larkin et al. |
| 2008/0309769 | A1 | 12/2008 | Albu et al. |

FOREIGN PATENT DOCUMENTS

| | | |
|---|---|---|
| WO | 87/05769 | 9/1987 |
| WO | 82/19068 | 10/1992 |
| WO | 95/24096 | 9/1995 |
| WO | 96/30873 A1 | 10/1996 |
| WO | 9937087 A1 | 7/1999 |

OTHER PUBLICATIONS

Sanjeev Kumar et al., "Global Motion Estimation in Frequency and Spatial Domain" Department of Electrical and Computer Engineering, UCSD, La Jolla, California, 2004.

Loy Hui Chein et al., "Robust Motion Estimation for Video Sequences Based on Phase-Only Correlation" Graduate School of Information Sciences, Tohoku University, Japan, Signal and Image Processing Aug. 23-25, 2004, Honolulu, Hawaii, USA pp. 441-446.

T. Vlachos, "Simple method for estimation of global parameters using sparse translation motion vector fields," Electronics Letters Jan. 8, 1998 vol. 34 No. 1.

Michael J. Black, "Combining Intensity and Motion for Incremental Segmentation and Tracking Over Long Image Sequences*'", National Aeronautics and Space Administration (NGT-20749 and NASA RTOP 506-47), by ONR Grant N00014-91-J-1577, and by a grant from the Whitaker Foundation, pp. 485-493, Department of Computer Science, Yale University, P.O. Box 2158 Yale Station, New Haven, CT 06520-2158, USA.

Hideki Yamauchi et al., "An 81 MHz, 1280×720pixels×30frames/s MPEG-4 Video/Audio Codec Processor", 2005, ISSCC 2005/ Session 7/ Multimedia Processing/ 7.2, pp. 97-130-131-589, Sanyo Electric, Gifu, Japan.

Hye-Yeon Cheong Tourapis et al., Fast Motion Estimation Within The H.264 CODEC, 2003, pp. III-517-III-520, IEEE, Corporate Research, Thomas multimedia Inc., 2 Independence Way, Princeton, NJ 08540, U.S.A.

Gagan B. Rath et al., "Iterative Least Squares and Compression Based Estimations for a Four-Parameter Linear Global Motion Compensation," IEEE Transactions on circuits and systems for video technology, vol. 9, No. 7, pp. 1075-1099, Department of Electrical Communication Engineering, Indian Institute of Science, Bangalore-560012, India, Publisher Item Identifier S 1051-8215(99)08175-6, 1999.

Til Aach and Andr'e Kaup, "Disparity-Based Segmentation of Stereoscopic Foreground/Background Image Sequences," <http://www.lfb.rwth-aachen.de/files/publications/old/AAC94a.pdf>, Dec. 15, 2006.

Alp Erturk and Sarp Erturk, "Unsupervised Segmentation of Hyperspectral Images Using Modified Phase Correlation," <http://kulis.kou.edu.tr/pub/grs106_mpc.pdf>, Oct. 4, 2006.

Yan Yang Hemami S.S, "Rate-Distortion-Based Combined Motion Estimation and Segmentation," <http://ieeexplore.ieee.org/xpl/freeabs_all.jsp?arnumber=727401>, Oct. 4, 1998.

Chang M.M et al., "Simultaneous Motion Estimation and Segmentation," <http://ieeexplore.ieee.org/xpl/freeabs_all.jsp?arnumber=623196>, Sep. 1997.

Gharavi H et al., "3-D Segmentation and Motion Estimation of Range Data for Crash Prevention," <http:// ieeexplore.ieee. org/search/freesrchabstract.jsp? arnumber=4290145&isnumber=4290055& punumber= 4290054&k 2dockey= 4290145@ ieeecnfs& query=((~~motion +estimation~~+ and+ segmentation+and+~~region+growing~~))% 3 Cin%3 Emetadata& pos=0, Jun. 13, 2007.

K. Takita, et al. "High-Accuracy Subpixel Image Registration of Multiple Frames of Video Images," Proc. Spie Conf. Vis. Comm. and Image Proc., vol. 3653, pp. 371-382, 1999.

Liang, Yi, "Phase-Correlation Motion Estimation," <http://scien.stanford.edu/class/ee392j/projects/projects/liang_report.pdf>.

Szeliski, R., "Video Mosaics for Virtual Environments," <http://www.cs.bu.edu/groups/ivc/exam/papers/szeliski.pdf>, Mar. 1996.

H. Foroosh et al., "Extension of Phase Correlation to Subpixel Registration," IEEE Trans. on Image Proc. vol. 11, No. 3, Mar. 2002, pp. 188-200.

G.A. Thomas, "Television Motion Measurement for DATV and Other Applications," BBC Res. Dept. Rep., No. 19887/11, 1987.

I.E. Abdou, "Practical Approach to the Registration of Multiple Frames of Video Images," Proc. SPIE Conf. Vis. Comm. and Image Proc., Vol. 3653, pp. 371-382, 1999.

V. Argyriou and T. Vlachos, "A Study of Sub-Pixel Motion Estimation Using Phase Correlation," British Machine Vision Conference, 2006.

L.H. Chien and T. Aoki, "Robust Motion Estimation for Video Sequences Based on Phase-Only Correlation," Proc. IASTED Int. Conf. on Signal and Image Processing, 2004.

M.A. Fischler and R.C. Bolles, "Random Sample Consensus: A Paradigm for Model Fitting with Applications to Image Analysis and Automated Cartography," Communications of the ACM, 24(6):381-395, Jun. 1981.

* cited by examiner

Reference Block    Current Block    Wrap-around effect due to FFT periodicity, for current block aligned with reference block

METHOD FOR HIGHLY ACCURATE ESTIMATION OF MOTION USING PHASE CORRELATION

FIELD OF THE INVENTION

The present invention relates to the field of image alignment. More particularly, the present invention relates to the field of motion estimation using phase correlation.

BACKGROUND OF THE INVENTION

Image alignment, or image registration, is an important aspect of many products and systems, including consumer cameras and video cameras, industrial machine vision, medical imaging, surveillance systems, and others. Image alignment is the process of transforming the image data of a current, or target, image and the image data of a reference image into one coordinate system. Image alignment is necessary in order to be able to compare or integrate the data obtained from different measurements. Motion estimation is used as part of the image alignment process.

Pixels are organized into blocks, which are the basic unit of analysis within an image. Motion estimation is a way of describing the difference between two images in terms of where each block of the former image has moved. Each block in a current image is associated with an area in a reference image, that it is well-correlated, using a "motion vector." The motion vectors may relate to the whole image, referred to as global motion estimation, or specific parts, such as rectangular blocks, arbitrary shaped patches or even per pixel.

FIG. 1 illustrates motion estimation between two images captured by a camera. An image 8 is of the same scene as an image 2, but the camera has been panned to the right. The effect of panning the camera to the right is that objects in the image 8 are shifted to the left relative to the same objects captured in the image 2. For example, a mountain 7 and a house 9 in the image 8 are shifted to the left relative to a mountain 4 and a house 6 in the image 2.

If these images are aligned by estimating the motion between them, there are numerous possible applications. One such application is to stitch the images together as part of a panoramic image, which can be further extended spatially by continuing the process with more images as the camera pans further right. Another application is to reduce noise by averaging together pixel observations that correspond to the same location in both images. These exemplary applications are simply two among many.

One disadvantage of estimating motion between full-resolution images is that the quantity of pixels to be processed can be prohibitively complex. For this reason, it may be desirable to reduce the size, and therefore the resolution, of the images prior to estimating their motion. Processing fewer pixels leads to a more manageable computational load.

Using smaller images reduces the computational load, but accuracy of the motion estimation (ME) method becomes much more important. For example, suppose that the images are down sampled by a factor of eight in each dimension. If the accuracy of ME is ½-pixel (measured at the resolution at which processing occurs), then processing at the reduced resolution yields accuracy of just ½×8=4 pixels when returned to full resolution. Such accuracy may be unacceptable. Thus, although an ME algorithm with ½-pixel accuracy may provide satisfactory alignment results when applied at full resolution, the same algorithm applied to reduced-resolution images may not be accurate enough. To achieve ½-pixel accuracy measured at full resolution, an ME estimation algorithm must have $1/16$-pixel accuracy when applied to images down sampled by eight.

The motion vectors can be measured as localized motion vectors, each motion vector associated with matching blocks between the two images. A motion field is a compilation of all localized motion vectors between the two images. For the two example images, the image 2 and the image 8, shown in FIG. 1, there are no independently moving objects in the scene. As such, the ideal motion field relating the image 8 to the image 2 should be a uniform motion field. FIG. 2 illustrates an ideal motion field relating the image 8 to the image 2 of FIG. 1. Each arrow represents the motion field of a corresponding block in the two images. Each arrow is facing right, which corresponds to the camera panning right between capturing the image 2 and then capturing the image 8. However, in practice, the measured motion field is not ideal. FIG. 3 illustrates an exemplary measured motion field relating the image 8 to the image 2. Incorrect motion vectors (MV) such as those shown in FIG. 3 can occur due to a variety of reasons, such as insufficient image detail or image noise. In general, the motion field of FIG. 3 is observed and measured, but it is desired to estimate the ideal global motion as it appears in FIG. 2. When errors can be as common and large as those shown in FIG. 3, a satisfactory solution requires some sort of robust model-fitting. The model must be robust in the sense that data points with big error, referred to as "outliers", do not adversely affect the output. Most robust model-fitting methods either explicitly or implicitly try to identify the outliers, and compute a final output based only on the reliable data. Identifying outliers as part of the model-fitting process can be computationally demanding, usually requiring some sort of iterative procedure.

The methods for finding motion vectors can be categorized into pixel based methods ("direct") and feature based methods ("indirect"). One such "direct" method is phase correlation, which uses a fast frequency-domain approach to estimate the relative translative offset between two similar images or blocks.

Using phase correlation, local motion analysis is performed on each block in an image. Phase correlation estimates motion by considering a window that surrounds the target block. FIG. 4 illustrates an example of applying phase correlation to local blocks of an image pair. The image pair includes a current image and a reference image. Each block has a size B×B. Each block is surrounded by a window of size N×N, where N≧B. In the example of FIG. 4, N=2B. Phase correlation considers an N×N window in both the current image and the reference image, where the windows may be co-located or, in the more general case, an offset may be present for the block in the reference image due to a motion predictor. FIG. 4 shows an example for co-located blocks and their corresponding windows.

Phase correlation consists of the following procedure: First, perform point-wise multiplication of the N×N window in the current frame with window function w[x,y]. For the window function w[x,y], a 2-D separable extension of the Hamming window can be used, whose 1-D definition is:

$$w[x] = 0.53836 - 0.46164\cos\left(\frac{2\pi x}{N-1}\right) \quad (1)$$

The 2-D window function is w[x,y]=w[x]w[y]. Alternatively, windows other than a Hamming window can be used. Apply the Fast Fourier Transform (FFT) to the result, which yields the complex values G[m,n]. Second, perform point-wise multiplication of the N×N window in the reference frame with window function w[x,y]. Apply the FFT to the result, which yields the complex values F[m,n]. Third, compute:

$$S[m, n] = \frac{F[m, n]G*[m, n]}{|F[m, n]G*[m, n]|} \quad (2)$$

where "*" denotes the complex conjugate, and "|" represents the magnitude of the complex argument. Fourth, compute the inverse FFT (IFFT) of S[m,n] to yield s[x,y], the phase correlation surface. Fifth, identify the K biggest peaks from the phase correlation surface. The indices of these peaks correspond to possible motions that are present between the N×N window in the current frame and the N×N window in the reference frame.

The phase correlation surface s[x,y] is a matrix of values. Each position in the matrix corresponds to a different motion (or shift), and the value at that position is the correlation corresponding to that particular motion. The step of identifying the K biggest peaks from the phase correlation surface finds the position (or motions, or shifts) that have the biggest value (or correlations). A peak position represents the integer component of the motion, because x and y only take integer values.

The peaks in the phase correlation surface represent possible motion vectors. Larger peaks indicate higher correlation, and the largest peak often indicates the dominant motion vector in the N×N window. If the motion vector aligns with the integer pixel grid, then the phase correlation peak is concentrated at a single position. However, if the motion vector is sub-pixel in nature instead, then the phase correlation peak energy is distributed across multiple positions. To determine the precise sub-pixel motion then requires further analysis.

There are a number of conventional methods to determine sub-pel precision from the phase correlation surface. These sub-pel methods can generally be categorized as 1-D methods or 2-D methods. A 1-D method operates on each spatial dimension independently. In other words, the vertical and horizontal sub-pel components of motion are determined separately.

FIG. 5 illustrates notation that is used by the different sub-pel methods. A correlation peak of the phase correlation surface is located at position $(x_k, y_k)$, with correlation value $C_{0,0}$. The coefficients $C_{u,v}$ are taken from the neighborhood of the peak in the correlation surface as $C_{u,v}=s[x_k+u, y_k+v]$. The 2-D sub-pel methods may use some or all of the correlation values in FIG. 5. Some 2-D sub-pel methods use even larger windows, for example using correlation value $C_{-3,-3}$. Note that due to properties of the FFT, evaluation of indices to the phase correlation surface s[x,y] is performed modulo N.

The 1-D sub-pel methods consider horizontal and vertical sub-pel components independently, and use the correlation values shown in FIG. 6. For example, the horizontal sub-pel component is determined using the correlation values $C_{-1,0}$, $C_{0,0}$, and $C_{1,0}$, and the vertical sub-pel component is determined using the correlation values $C_{0,-1}$, $C_{0,0}$, and $C_{0,1}$.

It is shown by H. Foroosh et al. in "Extension of Phase Correlation to Subpixel Registration" that the phase correlation surface in the presence of translational motion is very well approximated by a sinc function. Derivations in Foroosh et al. lead to a relatively simple 1-D sub-pel method that operates in each spatial direction independently. The method is applied to the neighborhood near the phase correlation peak.

In "Television Motion Measurement for DATV and Other Applications" by G. A. Thomas, a 1-D quadratic function is fit to the three points in the neighborhood of the phase correlation peak (either the horizontal or vertical values shown in FIG. 6). In "Practical Approach to the Registration of Multiple Frames of Video Images" by I. E. Abdou, a 1-D Gaussian function is fit in a similar fashion. Results for the methods of Thomas and Abdou are marginal, because as shown in Foroosh et al., the phase correlation surface is neither quadratic nor Gaussian, and as such the methods are limited because of inappropriate fitting functions. Also, in many cases the 1-D sub-pel methods do not provide as complete of a fit in the peak neighborhood as is possible when using the 2-D sub-pel methods.

In "A Study of Sub-Pixel Motion Estimation Using Phase Correlation" by V. Argyriou et al., the following modified sinc function is considered:

$$h(x) = \exp(-x^2)\frac{\sin(\pi x)}{\pi x}. \quad (3)$$

It is then determined the three parameters A, B, and C that best fit the function A·h(B[x−C]) to the observed phase correlation surface, in a least squares sense. Determining such a fit is complicated, since there is no closed-form solution. It thus requires numerical solution, which can be computationally demanding. Note that this method is also a 1-D sub-pel method, so that it shares the limitation mentioned previously for 1-D sub-pel methods compared to 2-D sub-pel methods.

In "High-Accuracy Subpixel Image Registration Based on Phase-Only Correlation" by Takita et al., it is proposed to fit a 2-D Gaussian function to the phase correlation surface. First, a frequency-domain Gaussian pre-filter (applied to S[m,n]) is used to smooth the phase correlation surface. Second, least squares is used to fit the 7×7 neighborhood of the correlation peak to a Gaussian function. The large window size combined with a least-squares optimization for the complicated Gaussian function can lead to an overly complex algorithm.

Finally, in "Robust Motion Estimation for Video Sequences Based on Phase-Only Correlation" by L. H. Chien et al., it is proposed to fit the following 2-D function to the phase correlation surface near the correlation peak:

$$h(x, y) = \frac{\alpha}{N^2} \frac{\sin[\pi(x + \Delta x)]\sin[\pi(y + \Delta y)]}{\sin\left[\frac{\pi}{N}(x + \Delta x)\right]\sin\left[\frac{\pi}{N}(y + \Delta y)\right]}. \quad (4)$$

An unspecified frequency-domain pre-filter is used to smooth the phase correlation surface. An unspecified size for the fitting window is also used, although it appears from a figure that the window size may be 7×7. The complicated nature of the equation h(x,y) leads to a computationally demanding least-squares solution for the Δx and Δy, and for α which must be estimated as part of the solution.

SUMMARY OF THE INVENTION

An image alignment method includes computationally efficient methods of achieving high-accuracy local motion estimates by using phase correlation. The image alignment method also provides a method of estimating motion reliability that allows a generic robust model fitting algorithm to produce more accurate results while operating much more efficiently. The image alignment method includes three methods to determine sub-pel motion estimation with improved accuracy. The three sub-pel motion estimation methods include a 5-parameter quadratic fit method, a 6-parameter quadratic fit method, and a 6-parameter least-squares quadratic fit method. Each of the sub-pel motion estimation methods uses phase correlation, and are based on fitting computationally efficient 2-D quadratic surfaces to a phase correlation surface. Prior to fitting a quadratic surface to the phase correlation surface, a pre-filter is applied which shapes the phase correlation surface to enable appropriate fitting to the quadratic surface. The image alignment method also includes a method to compensate for bias prior to applying a sub-pel motion estimation method.

The image alignment method further includes two methods to estimate the reliability of the sub-pel motion estimates determined using phase correlation. The two methods for estimating reliability are based on either the difference in the Zero mean Sum of Absolute Difference (ZSAD) of the top two motion estimate candidates from phase correlation, or the ratio of the phase correlation values of the top two motion estimate candidates from phase correlation.

In an aspect, an image alignment method is disclosed. The method includes storing a reference image and a current image in a memory, wherein the reference image is defined by a first set of local pixel blocks and the current image is defined by a second set of local pixel blocks; applying phase correlation to a first block in the reference image and a first block in the current image to generate a phase correlation surface between the first block of the reference image and the first block of the current image, wherein the phase correlation surface is defined by a set of correlation points each having a correlation value; filtering the phase correlation surface using a filter that is fit by a first quadratic surface, thereby forming a filtered phase correlation surface having a filtered set of correlation points; determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and determining a global motion between the reference image and the current image by fitting a set of motion vectors corresponding to the second set of blocks in the current image to a global motion model.

In another aspect, a system for aligning images is disclosed. The system includes a memory for storing a current image and a reference image, wherein the reference image is defined by a first set of local pixel blocks and the current image is defined by a second set of local pixel blocks; and a program for applying phase correlation to a first block in the reference image and a first block in the current image to generate a phase correlation surface between the first block of the reference image and the first block of the current image, wherein the phase correlation surface is defined by a set of correlation points each having a correlation value; filtering the phase correlation surface using a filter that is fit by a first quadratic surface, thereby forming a filtered phase correlation surface having a filtered set of correlation points; determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and determining a global motion between the reference image and the current image by fitting a set of motion vectors corresponding to the second set of blocks in the current image to a global motion model.

In some embodiments, the method or program includes a five parameter quadratic fit method to determine the sub-pel motion estimation, wherein the five parameters are derived from the correlation values corresponding to the peak correlation point and the neighborhood of four correlation points about the peak correlation point. In other embodiments, the method of program includes a six-parameter quadratic fit method to determine the sub-pel motion estimation, wherein the six parameters are derived from the correlation values corresponding to the peak correlation point and the neighborhood of five correlation points about the peak correlation point. In still other embodiments, the method or program includes a six-parameter least squares quadratic fit method to determine the sub-pel motion estimation, wherein the six parameters are derived from a least squares fit of the correlation values corresponding to the peak correlation point and the neighborhood of eight correlation points about the peak correlation point.

The filter can be a spatial-domain filter or the filter can be a frequency-domain filter. The first quadratic surface can be defined by $p[x,y]=1-\frac{1}{3}x^2-\frac{1}{3}y^2$, where $x,y=-1,0,1$. The method or program can be further configured for modifying the sub-set of correlation values prior to determining the sub-pel motion estimation in order to compensate for bias. The method or program can be further configured for determining a motion vector for each block in the current image.

In some embodiments, the method or program is further configured for determining a reliability value of the motion vector. In some embodiments, if the reliability value is less than a threshold value, the motion vector is removed from the set of motion vectors used in determining the global motion. In other embodiments, each motion vector in the set of motion vectors is weighted according to the reliability value, thereby forming a weighted set of motion vectors used to determine the global motion. In some embodiments, the reliability value is determined by contrasting the largest peak correlation value to a second-largest peak correlation value of the filtered set of correlation values. In other embodiments, the method or program is further configured for determining a second motion vector for each block, wherein the second motion vector corresponds to a second-largest peak correlation value of the filtered set of correlation points, further wherein the reliability value is determined by contrasting a zero-mean sum of absolute difference of the motion vector to a zero-mean sum of absolute difference of the second motion vector. In some embodiments, the reliability value is determined by contrasting the largest peak correlation value to a second-largest peak correlation value of the set of correlation values. In other embodiments, the method or program is further configured for determining a second motion vector for each block, wherein the second motion vector corresponds to a second-largest peak correlation value of the set of correlation points, further wherein the reliability value is determined by contrasting a zero-mean sum of absolute difference of the motion vector to a zero-mean sum of absolute difference of the second motion vector. In some embodiments, the largest peak correlation point has a largest value of the filtered set of correlation points of the filtered phase correlation surface. In other embodiments, the largest peak correlation point has a largest value of the set of correlation points of the phase correlation surface.

BRIEF DESCRIPTION OF THE DRAWINGS

Embodiments of the image alignment method are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
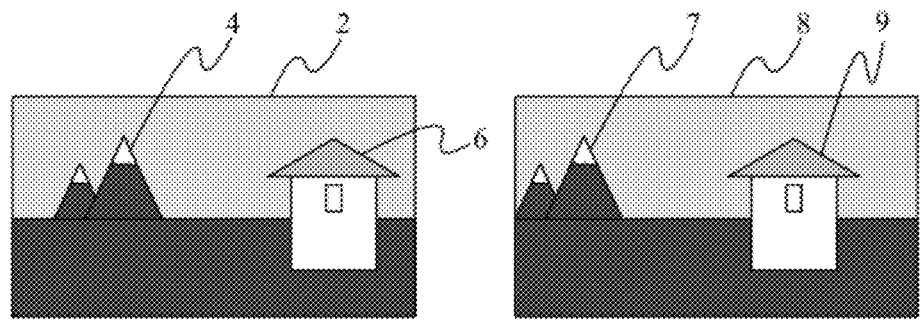
FIG. 1 illustrates motion estimation between two images captured by a camera.
Figure 2:
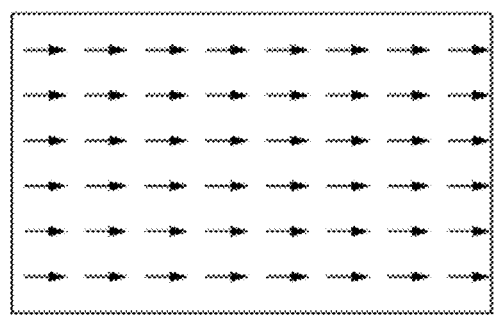
FIG. 2 illustrates an ideal motion field relating the two images of FIG. 1.

Embodiments of the present application are directed to an image alignment method. Those of ordinary skill in the art will realize that the following detailed description of the image alignment method is illustrative only and is not intended to be in any way limiting. Other embodiments of the image alignment method will readily suggest themselves to such skilled persons having the benefit of this disclosure.

Reference will now be made in detail to implementations of the image alignment method as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of an image alignment method include two generalized components. A first component consists of computationally efficient methods of achieving high-accuracy local motion estimates by using phase correlation. High accuracy is especially important for applications that, for reasons of computational efficiency, process images at reduced resolution. A second component addresses robust fitting of the local motion estimates to a global camera model. The second component provides a method of estimating motion reliability that allows a generic robust model fitting algorithm to produce more accurate results while operating much more efficiently. Any conventional means can be used by which a system performs the robust model fitting. The image alignment method can be used by conventional applications that perform image alignment.

More specifically, the image alignment method includes determining sub-pel motion estimation with improved accuracy, determining the reliability of the individual motion vectors determined by the sub-pel motion estimation and discarding, or giving lower weight, those individual motion vectors determined not to be sufficiently accurate, determining the global motion between two images by fitting a global camera model to the remaining or weighted individual motion vectors, and aligning the two images according to the determined global motion. By identifying the inaccurate, or outlier, individual motion vectors prior to performing model fitting, the model-fitting procedure becomes both more accurate and more computationally efficient.

The image alignment method includes three methods to determine sub-pel motion estimation with improved accuracy. The three sub-pel motion estimation methods include a 5-parameter quadratic fit method, a 6-parameter quadratic fit method, and a 6-parameter least-squares quadratic fit method. Each of the sub-pel motion estimation methods uses phase correlation, and are based on fitting computationally efficient 2-D quadratic surfaces to a phase correlation surface. Prior to fitting a quadratic surface to the phase correlation surface, a pre-filter is applied. The pre-filter shapes the phase correlation surface to enable appropriate fitting to the quadratic surface. The pre-filter is implemented either in the frequency domain, prior to the final inverse Fast Fourier Transform (IFFT), or in the spatial domain, after the final IFFT.

Under some common circumstances, certain properties of the phase correlation surface can lead to a bias in the sub-pel motion estimates. This is generally true for sub-pel motion estimation using the phase correlation surface. The bias relates to the non-zero mean error that is dependent on the actual motion. As the block size decreases, the bias increases. The bias is roughly a linear function that increases with increasing motion from image to image or block to block. The image alignment method includes a method to compensate for this bias, which is described in detail below.

The image alignment method further includes two methods to estimate the reliability of the sub-pel motion estimates determined using phase correlation. Determining the reliability of the sub-pel motion estimates is particularly useful when combining many different motion estimates from application of phase correlation to different locations of an image pair. In this manner, unreliable motion estimates are identified and prevented from corrupting any global motion estimation.

Identifying such unreliable motions also reduces computational complexity because most outlier motion estimates are pre-identified; with a higher percentage of good motion estimates, it becomes easier to identify any bad motion estimates not initially pre-identified. The complexity savings are typically in the form of many fewer iterations of the robust model-fitting algorithm. The two methods for estimating reliability are based on either the difference in the Zero-mean Sum of Absolute Difference (ZSAD) of the top two motion estimate candidates from phase correlation, or the ratio of the phase correlation values of the top two motion estimate candidates from phase correlation.

A. Sub-Pel Motion Estimation Methods

Three sub-pel motion estimation methods are described, which are referred to as the 5-parameter quadratic fit method, the 6-parameter quadratic fit method, and the 6-parameter least-squares quadratic fit method. The sub-pel motion estimation methods are 2-D methods and are applied to a filtered phase correlation surface. Filtering is applied because the phase correlation surface is not a smooth function, and fitting a smooth surface to a non-smooth surface is less effectual. The phase correlation surface is not smooth due to considerable high-frequency content, both from the correlation peak, which is ideally an impulse, and from noise. The filter p[x,y] is the filter in the spatial domain, which is applied by convolution in the spatial domain with s[x,y]. The filter P[m,n] is the equivalent filter in the frequency domain, which is applied by point-wise multiplication in the frequency domain with S[m,n]. In some embodiments, the filter p[x,y] is specified in the spatial domain as the 3×3 filter p[x,y]:

$$p = \frac{1}{3}\begin{bmatrix} 1 & 2 & 1 \\ 2 & 3 & 2 \\ 1 & 2 & 2 \end{bmatrix}. \quad (5)$$

Note that the spatial-domain filter in equation (5) is perfectly fit by a quadratic surface:

$$p[x,y] = 1 - \frac{1}{3}x^2 - \frac{1}{3}y^2, \text{ where } x,y = -1, 0, 1. \quad (6)$$

Equation (5) specifies the filter p[x,y] in matrix form, and equation (6) specifies the filter p[x,y] in function form. Note that the definitions of the filter in equation (5) and equation (6) are considered to be equivalent. Equation (6) shows explicitly how the coefficients in equation (5) happen to fit a quadratic surface. The equations (5) and (6) represent the filter in the spatial domain. The filter P[m,n] in the frequency domain is defined as the Fourier Transform of the filter p[x,y] in the spatial domain, P[m,n]=FFT{p[x,y]}, or equivalently as p[x,y]=IFFT {P[m,n]}. In other words, P[m,n] is the Fourier Transform of p[x,y], and hence the frequency response. Or equivalently, P[m,n] is the frequency domain representation of the filter p[x,y]. The ability to apply the filter either in the spatial domain or in the frequency domain is due to special properties of the Fourier Transform operator. In general, it is well known about the equivalence of convolution in one domain and multiplication in the other domain.

Figure 7:
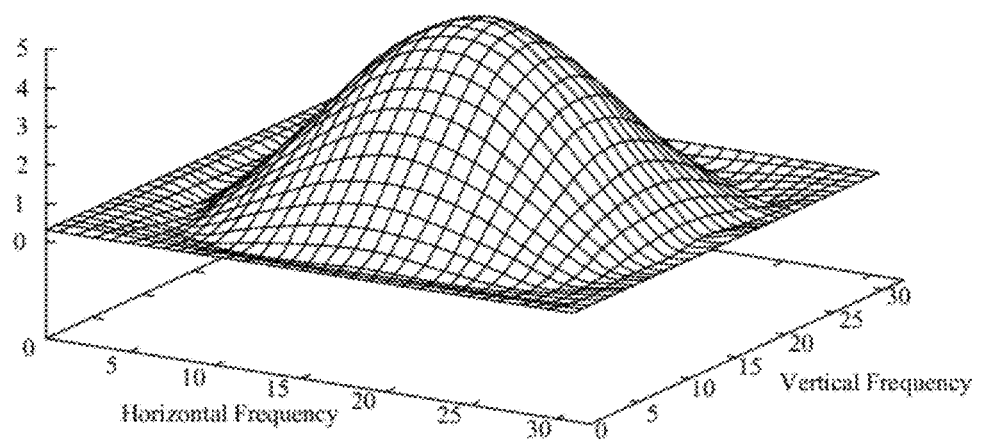
FIG. 7 illustrates a magnitude of a frequency-domain filter response P[m,n] for phase correlation frequency shaping.

FIG. 7 illustrates a magnitude of a frequency-domain filter response P[m,n] for phase correlation frequency shaping. The graph in FIG. 7 shows the general low-pass nature of the filter p[x,y] having high response near the center of the plot, and low response near the edges of the plot. The low-pass nature of P[m,n] may also reduce effects of unreliable high frequency components. In some embodiments, the filter is applied in the spatial domain through direct convolution of s[x,y] with the above 3×3 filter kernel p[x,y], instead of by point-wise multiplication in the Fourier domain of S[m,n] with the filter response P[m,n]. Although the filter is defined by the equations (5) and (6), alternative filters can be used provided the alternative filters are low-pass in nature and can be well approximated locally as a quadratic surface.

Figure 17:
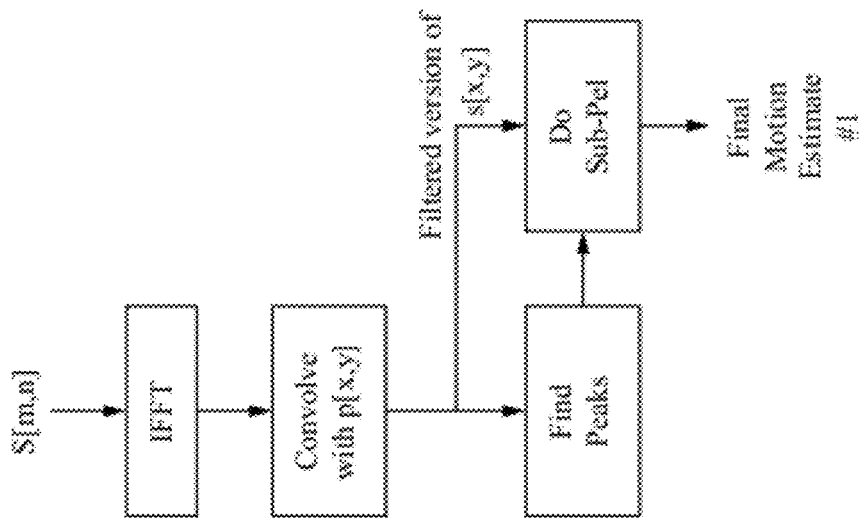
FIG. 17 illustrates a generalized block diagram of the image alignment method according to a second embodiment.
Figure 16:
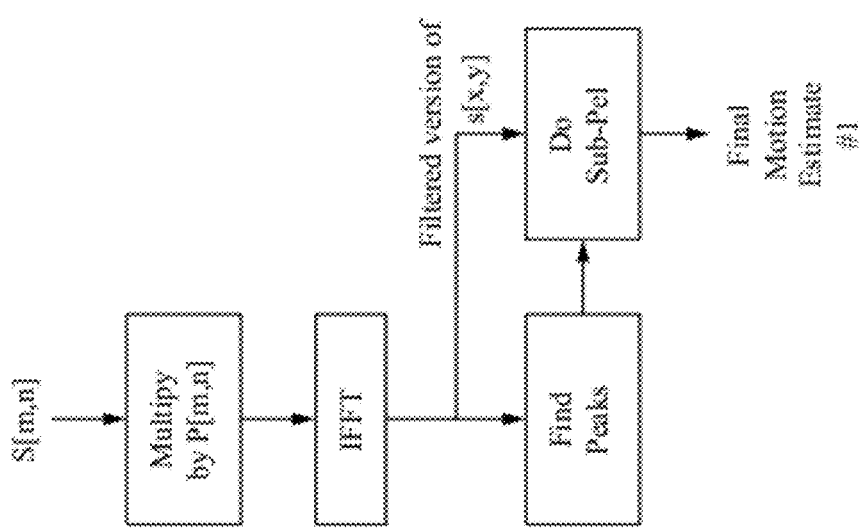
FIG. 16 illustrates a generalized block diagram of the image alignment method according to a first embodiment.

The image alignment method includes the generalized steps of generating a phase correlation surface, filtering the phase correlation surface, determining peak correlation points either from the phase correlation surface or the filtered version of the phase correlation surface, and performing sub-pel motion estimation to determine an overall motion estimate for each block. FIG. 16 illustrates a generalized block diagram of the image alignment method according to a first embodiment. FIG. 17 illustrates a generalized block diagram of the image alignment method according to a second embodiment. As described above, the filtered version of the phase correlation surface s[x,y] is determined by either multiplying S[m,n] by the filter P[m,n] in the frequency domain, and applying the IFFT to the result, as shown in FIG. 16, or by applying the IFFT to S[m,n] to generate the phase correlation surface s[x,y], and then convolving the phase correlation surface s[x,y] with the filter p[x,y] in the spatial domain, as shown in FIG. 17. In both the processes shown in FIGS. 16 and 17, the correlation peaks are found from the filtered phase correlation surface, and the sub-pel motion estimation is performed using the filtered phase correlation surface and the correlation peaks of the filtered phase correlation surface.

Figure 18:
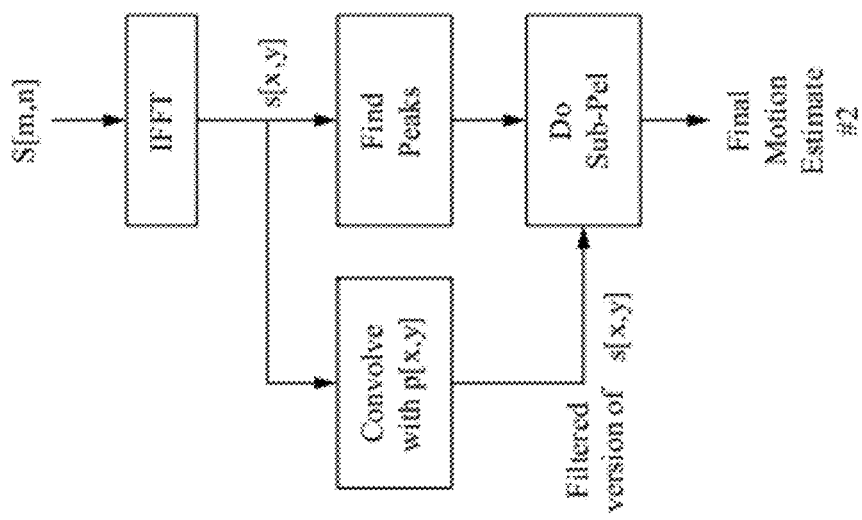
FIG. 18 illustrates a generalized block diagram of the image alignment method according to a second embodiment.

FIG. 18 illustrates a generalized block diagram of the image alignment method according to a third embodiment. In the same manner as the processes of FIGS. 16 and 17, the filtered version of the phase correlation surface s[x,y] is determined by applying the IFFT to S[m,n] to generate the phase correlation surface s[x,y], and then convolving the phase correlation surface s[x,y] with the filter p[x,y] in the spatial domain, as shown in FIG. 18. In contrast to the processes of FIGS. 16 and 17, the process of FIG. 18 finds the correlation peaks from the phase correlation surface s[x,y], instead of from the filtered phase correlation surface, as in the processes of FIGS. 16 and 17. The sub-pel motion estimation is performed using the filtered phase correlation surface and the correlation peaks of the phase correlation surface.

As described above, a phase correlation surface has multiple correlation peaks for each block. As such, the filtered phase correlation surface also has multiple correlation peaks. The three sub-pel motion estimate methods determine the sub-pel motion estimates for each of the desired multiple correlation peaks. As shown in FIGS. 16 and 17, the correlation peaks are determined from the filtered set of correlation peaks of the filtered phase correlation surface. Alternatively, the correlation peaks are determined from the unfiltered set of correlation points of the phase correlation surface s[x,y], as shown in FIG. 18. The results of the process shown in FIG. 16, final motion estimate #1, are equivalent to the results of the process shown in FIG. 17. The results are equivalent because of equivalence between frequency-domain multiplication and spatial-domain convolution. Both processes find correlation peaks from the filtered version of the phase correlation surface s[x,y]. The results of the process shown in FIG. 18 may be different than the results of processes shown in FIGS. 16 and 17. The results may be different because the process of FIG. 18 finds correlation peaks from the unfiltered phase correlation surface s[x,y], as opposed to the processes of FIGS. 16 and 17 that find correlation peaks from the filtered version of the phase correlation surface s[x,y]. In some cases, the results of the process of FIG. 18 and the results of the processes of FIGS. 16 and 17 are equal, which is the case when the same correlation peaks are found. In other cases, the results are not equal, which is the case when different correlation peaks are found. In all three processes shown in FIGS. 16, 17, and 18, the sub-pel motion estimation is performed using the filtered version of the phase correlation surface s[x,y]. The output of the "Find Peaks" block is the integer peak position, labeled as $(x_k, y_k)$. The output of the "Find Peaks" block indicates to the sub-pel motion estimation method where to initiate sub-pel motion estimation in the phase correlation surface s[x,y] or the filtered version of the phase correlation surface s[x,y]. The "Do Sub-Pel" block considers the 3×3 neighborhood of position $(x_k, y_k)$, received from the "Find Peaks" block as a first input, in the surface supplied as the second input, which in this case is the filtered version of the phase correlation surface s[x,y].

The first of the sub-pel motion estimation methods is the five-parameter quadratic fit method. The five-parameter quadratic surface method fits the quadratic equation (7) to the neighborhood of the correlation peak:

$$C_{x,y} = ax^2 + bx + cy^2 + dy + f \quad (7)$$

Figure 8:
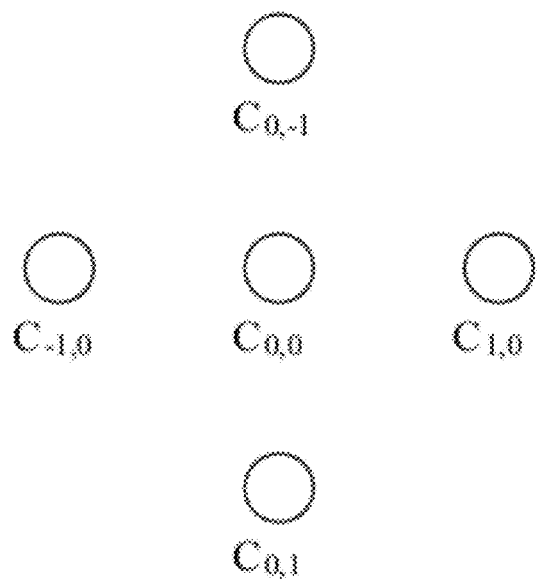
FIG. 8 illustrates a neighborhood configuration for the five-parameter quadratic fit method.

The neighborhood consists of the five positions that include the correlation peak, vertical neighbors on either side of the correlation peak, and the horizontal neighbors on either side of the correlation peak, as shown in FIG. 8. As shown in FIG. 8, the correlation peak has a correlation value $C_{0,0}$. The coefficients a, b, c, d, and f of equation (7) are determined according to:

$$f = C_{0,0}$$

$$d = 0.5(C_{0,1} - C_{0,-1})$$

$$c = C_{0,1} - d - f$$

$$b = 0.5(C_{1,0} - C_{-1,0})$$

$$a = C_{1,0} - b - f$$

This choice of coefficients allows a perfect fit of the correlation values in FIG. 8 with the quadratic surface in equation (7). After computing the coefficients, the sub-pel motion estimates are determined according to:

$$\Delta_x = \frac{-2cb}{4ac},$$

$$\Delta_y = \frac{-2ad}{4ac}.$$

This choice of sub-pel estimates corresponds to the sub-pel position of the maximum value of the surface in equation (7). The final sub-pel motion is then the integer peak position $(x_k, y_k)$, plus the sub-pixel offset $(\Delta_x, \Delta_y)$.

The second of the sub-pel motion estimation methods is the six-parameter quadratic fit method. The six-parameter quadratic surface method fits the quadratic equation (8) to the neighborhood of the correlation peak:

$$C_{x,y} = ax^2 + bx + cy^2 + dy + cxy + f \quad (8)$$

The neighborhood consists of the five positions that include the correlation peak, vertical neighbors on either side of the correlation peak, and the horizontal neighbors on either side of the correlation peak, plus one corner neighbor at position (k,m), where:

$$k = 1 \text{ if } C_{1,0} > C_{-1,0}$$

$$k = -1 \text{ otherwise}$$

$$m = 1 \text{ if } C_{0,1} > C_{0,-1}$$

$$m = -1 \text{ otherwise}.$$

Figure 9:
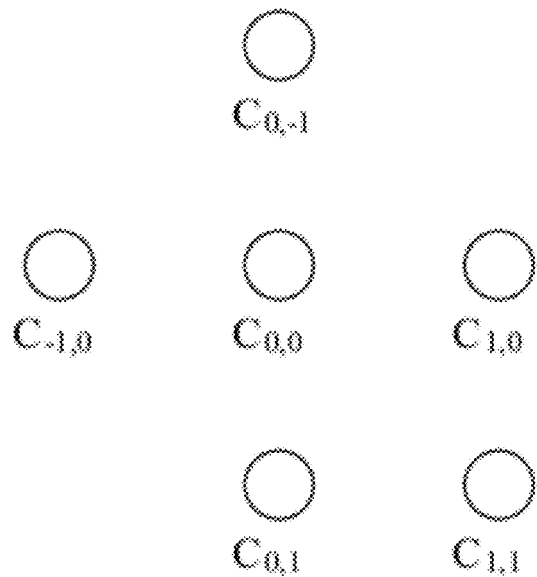
FIG. 9 illustrates a neighborhood configuration for the six-parameter quadratic fit method.

The six-position neighborhood is shown in FIG. 9 for the case where k=m=1. In this exemplary case, the correlation value $C_{1,1}$ is the correlation value for the corner in the direction of highest horizontal and vertical correlation from the correlation peak at center. The coefficients a, b, c, d, e, and f of equation (8) are determined according to:

$$f = C_{0,0}$$

$$d = 0.5(C_{0,1} - C_{0,-1})$$

$$c = C_{0,1} - d - f$$

$$b = 0.5(C_{1,0} - C_{-1,0})$$

$$a = C_{1,0} - b - f$$

$$e = km(C_{k,m} - a - bk - c - dm - f).$$

This choice of coefficients allows a perfect fit of the example correlation values in FIG. 9 with the quadratic surface in equation (8). After computing the coefficients, the sub-pel motion estimates are determined according to:

$$\Delta_x = \frac{ed - 2cb}{4ac - e^2},$$

$$\Delta_y = \frac{eb - 2ad}{4ac - e^2}.$$

This choice of sub-pel estimates corresponds to the sub-pel position of the maximum value of the surface in equation (8). The final sub-pel motion is then the integer peak position $(x_k, y_k)$, plus the sub-pixel offset $(\Delta_x, \Delta_y)$. In some embodiments, the sub-pel motion estimates are each clipped to the range $\pm \frac{1}{2}$. In general, clipping a value z to $\pm \frac{1}{2}$, which means clipping to the range $[-\frac{1}{2}, \frac{1}{2}]$, is defined here as:

$$\text{CLIP\_HALF}(z) = \begin{cases} \frac{1}{2} & \text{if } z \geq \frac{1}{2} \text{ else} \\ -\frac{1}{2} & \text{if } z \leq -\frac{1}{2} \text{ else} \\ z \end{cases}$$

Figure 10:
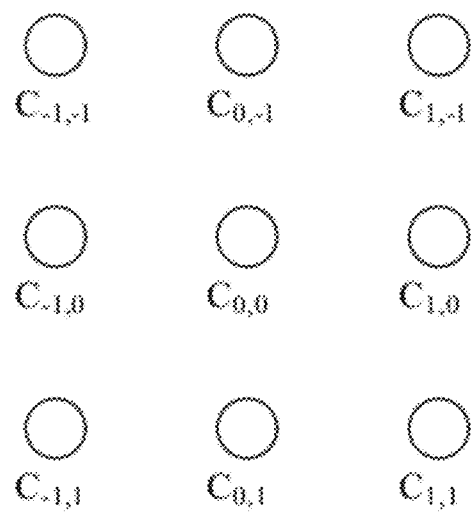
FIG. 10 illustrates a neighborhood configuration for the six-parameter least squares quadratic fit method.

The third of the sub-pel motion estimation methods is the six-parameter least-squares quadratic fit method. The six-parameter least-squares quadratic surface method fits the quadratic equation (8) to the neighborhood of the correlation peak. However, instead of using just six points in the neighborhood, all nine points in the 3×3 neighborhood, as shown in FIG. 10, are used to generate a least squares fit.

The following equations are based on a least-squares derivation, in which the coefficients of equation (8) are chosen to minimize the sum of the squared errors between the data points $C_{x,y}$, x,y in $\{-1,0,1\}$, and the quadratic surface defined by equation (8). After the least-squares derivation, the coefficients a, b, c, d, e, and f of equation (8) are determined according to:

$$\begin{bmatrix} a \\ b \\ c \\ d \\ e \\ f \end{bmatrix} = \frac{1}{36} \begin{bmatrix} 18 & 0 & 0 & 0 & 0 & -12 \\ 0 & 6 & 0 & 0 & 0 & 0 \\ 0 & 0 & 18 & 0 & 0 & -12 \\ 0 & 0 & 0 & 6 & 0 & 0 \\ 0 & 0 & 0 & 0 & 9 & 0 \\ -12 & 0 & -12 & 0 & 0 & 20 \end{bmatrix} r,$$

where the vector r is:

$$r = \sum_{x=-1}^{1} \sum_{y=-1}^{1} \begin{bmatrix} x^2 C_{x,y} \\ x C_{x,y} \\ y^2 C_{x,y} \\ y C_{x,y} \\ xy C_{x,y} \\ C_{x,y} \end{bmatrix}.$$

After computing the coefficients, the sub-pel motion estimates are determined according to:

$$\Delta_x = \frac{ed - 2cb}{4ac - e^2},$$

$$\Delta_y = \frac{eb - 2ad}{4ac - e^2}.$$

This choice of sub-pel estimates corresponds to the sub-pel position of the maximum value of the surface in equation (8). The final sub-pel motion is then the integer peak position $(x_k, y_k)$, plus the sub-pixel offset $(\Delta_x, \Delta_y)$. In some embodiments, the sub-pel motion estimates are clipped to the range $\pm\frac{1}{2}$.

In some embodiments, the correlation values of the filtered phase correlation surface are compensated for bias prior to application of one of the sub-pel motion estimation methods. Before describing a method of compensating for bias it is necessary to understand the nature of the bias.

The phase correlation motion estimation technique computes a normalized cross correlation in the frequency domain with the Fast Fourier Transform (FFT). Using the FFT of size N makes an implicit assumption that the signal is periodic in both space and frequency with period N. A window function is used to prevent errors in the correlation due to the "wrapping" effect from periodicity. In some embodiments, the window function is a Hamming window. In other embodiments, other conventional window functions are used.

Figures 11A, 11B, 11C:
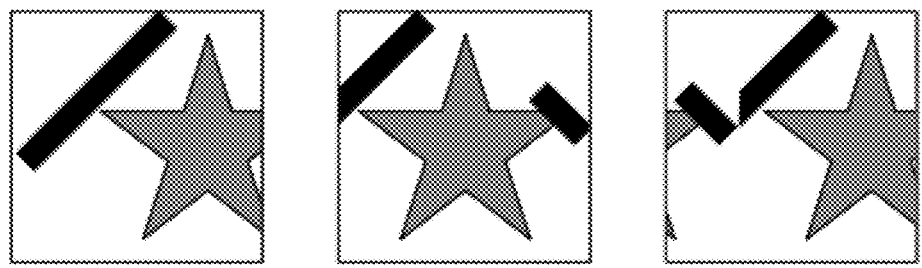
FIGS. 11A-11C illustrate example images to demonstrate decreasing correlation with increasing motion.

For phase correlation, an unavoidable consequence of windowing is that the magnitude of the correlation peak decreases as the motion deviates from zero. A simple example of this is shown in FIGS. 11A-11C. If there were no motion, the stars in the current block and the reference block coincide perfectly, and a very strong peak is observed in the phase correlation surface. However, if there is motion between the current block and the reference block, as shown in the current block of FIG. 11B relative to the reference block of FIG. 11A, then there is an implicit periodicity imposed by using the FFT to compute correlation, as shown in FIG. 11C. The figure demonstrates that by using the FFT to compute correlation, the actual correlation value for the shift corresponding to the true motion (between the current block and the reference block) includes both desired and undesired components.

There are two main effects. First, there is less overlapping area between the image content in FIGS. 11A and 11C, so there is less energy for the correlation peak. Second, the false information introduced by the periodicity, shown at the left of the block in FIG. 11C, appears as noise in the phase correlation surface. In practice, not only the area of overlap is important, but also the effect of windowing, which was not explicitly shown in FIG. 11.

As motion increases, the correlation peak in the phase correlation surface decreases accordingly because the area of overlap of the desired components decreases. For sub-pel motion estimation methods that operate in the neighborhood of the correlation peak, the decreasing correlation away from zero can introduce measurable bias in the sub-pel motion estimates. This is because within the neighborhood of the correlation peak, the correlation values that are used by the sub-pel motion estimation method each have a different bias, because of the decaying nature of the energy of the correlation peak. These biases can be compensated by adjusting the correlation values prior to using them in the sub-pel motion estimation method.

Figures 12A, 12B, 12C:
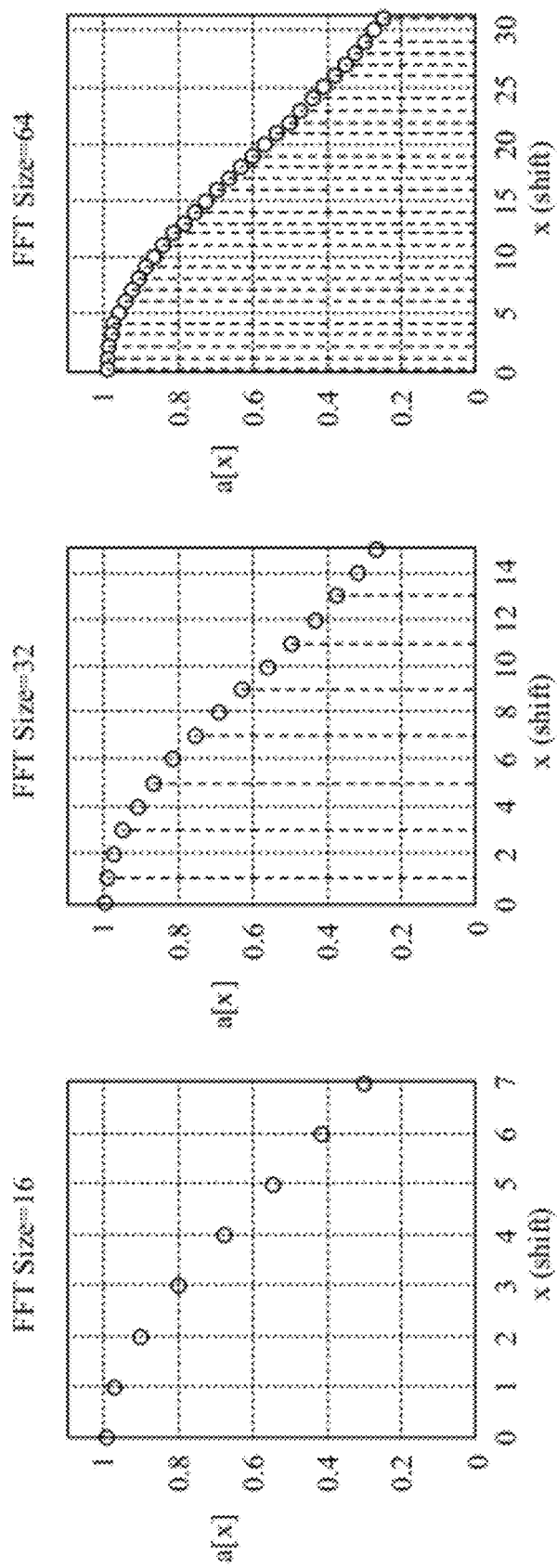
FIGS. 12A-12C illustrate the summation of the product of the Hamming window and the shifted version of the Hamming window for FFT sizes of 16, 32, and 64.

The following discussion provides a basis for the use of bias compensation, where the 1-D situation is considered for clarity. Consider the overlap between the Hamming window and a horizontally shifted version of the Hamming window. As the shift increases, the energy in the product of the overlap decreases, and hence the energy in overlap of the actual image content decreases. This effect can be quantified by summing the product of the window and its shifted version. FIGS. 12A-12C illustrate the summation of the product of the Hamming window and the shifted version of the Hamming window for FFT sizes of 16, 32, and 64. Here 'x' is an index that corresponds to shift, in the same manner that 'x,y' are indices that correspond to shift in the correlation surface s[x,y]. As the shift 'x' increases, the resulting roll-off in the figures corresponds roughly to the decrease in the phase correlation peak that will be observed, relative to a peak of unity for zero motion. Note that each plot has been normalized so that the data point corresponding to zero motion is one, and that if the motion were negative the plots would be symmetric extensions to the left. As an example, according to the plot for FFT size of 16 shown in FIG. 12A, the correlation peak for a block's motion of 3 is expected to be approximately 80% of the correlation peak if the same block's motion were 0.

Figures 13A, 13B, 13C:
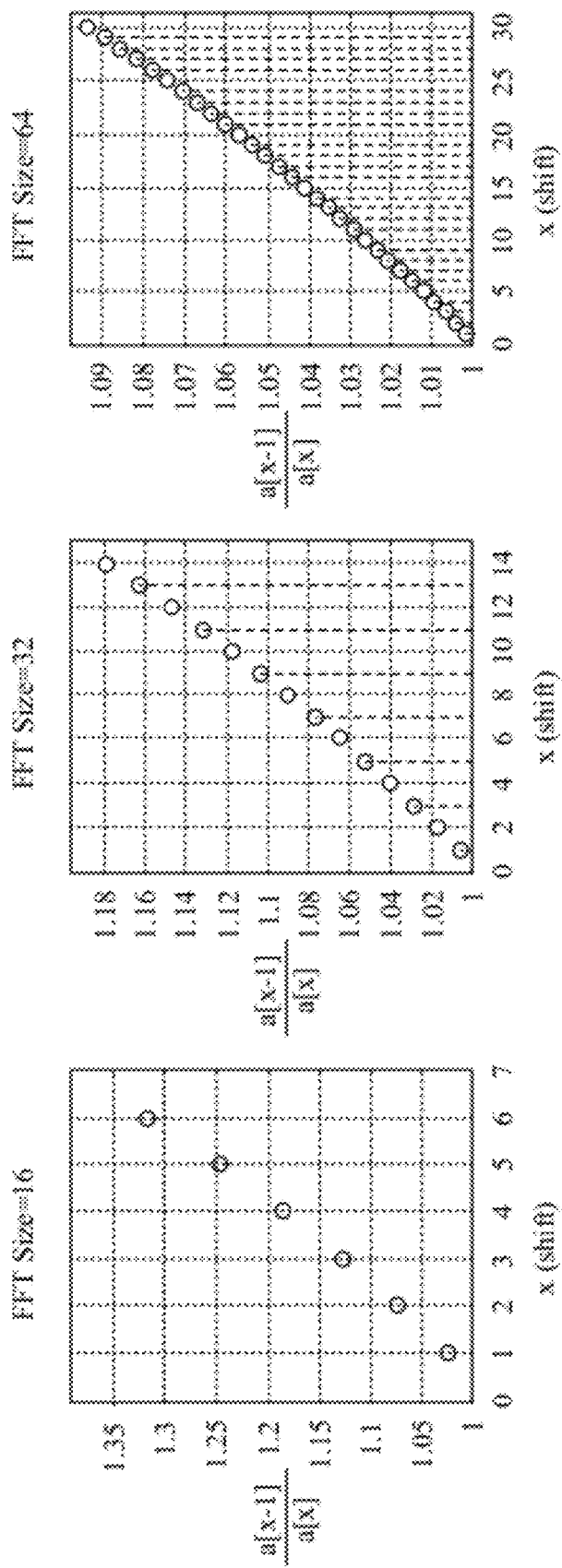
FIGS. 13A-13C illustrate plots of the differences between adjacent points in the overlapped window plots of FIGS. 12A-12C.

Since the primary application considers a local 3×3 window near the correlation peak, the absolute changes for all correlation values are not of interest. Instead, the relative difference between neighboring correlation values is of interest. FIGS. 13A-13C illustrate plots of the differences between adjacent points in the overlapped window plots of FIGS. 12A-12C. The plots shown in FIGS. 13A-13C show the ratio of a[x−1]/a[x], where a[x] is element x from the plots in FIGS. 12A-12C. If there is no bias, then the ratio of a[x−1]/a[x]=1. To interpret these results, consider the plot for FFT size of 16. If the correlation peak is at position x=4, the plot of FIG. 13A indicates that the correlation value for x=5 is to be increased by a factor of 1.25 times because the plot shows that a[4]/a[5]=1.25, which thus compensates for the decreasing nature of the peak located at x=4. Note that the further the shift is from zero, the more bias compensation is needed in the local 3×3 window. Also, the larger the block size, for example the larger the size of the FFT, the smaller the bias compensation. For example, a shift of $x_0$ with FFT size 16 requires much stronger compensation than a shift of $4x_0$ with FFT size 64.

The curves shown in FIGS. 13A-13C are approximated as linear functions of shift, and the correlation values in the 3×3 window are compensated accordingly. The approximation is b[x]=a[x−1]/a[x]=1+kx, where k corresponds to the slope of the approximately linear functions in FIG. 13. Note that the slope of the lines changes by a factor of ¼ for each doubling of FFT size. In general, the correlation values are compensated by a correction factor prior to performing a sub-pel motion estimation method. The correction values are compensated by some amount that is increasing as a function of the shift x. The discussion of bias thus far has been for the 1-D case. For images, the 2-D case is considered. For the 2-D case, both horizontal and vertical shifts x,y are considered. The modifications are applied in the 3×3 neighborhood of the peak, which have been denoted previously as $C_{u,v}$, u,v in {−1,0,1}. The coordinates of the correlation peak are denoted as $x_k, y_k$, which means that $C_{u,v}=s[x_k+u, y_k+v]$, u,v in {−1,0,1}, where s[x,y] is the phase correlation surface. There are different ways to apply the compensation. The following is an exemplary method. Start with the $C_{u,v}$ values defined above, with the given peak position of $x_k, y_k$. Then, compensate for the bias in the horizontal direction:

If $x_k>0$ then $C_{1,v}=C_{1,v}*b[x_k+1]$, for v={−1,0,1}, $C_{−1,v}=C_{−1,v}/b[x_k]$, for v={−1,0,1}.

Else if $x_k<0$ then $C_{1,v}=C_{1,v}/b[|x_k|]$, for v={−1,0,1}, $C_{−1,v}=C_{−1,v}*b[|x_k|+1]$, for v={−1,0,1}.

Compensate for the bias in the vertical direction:
If $y_k>0$ then $C_{u,1}=C_{u,1}*b[y_k+1]$, for u={−1,0,1}, $C_{u,−1}=C_{u,−1}/b[y_k]$, for u={−1,0,1}.

Else if $y_k<0$ then $C_{u,1}=C_{u,1}/b[|y_k|]$, for u={−1,0,1}.

$C_{u,−1}=C_{u,−1}*b[|y_k|+1]$, for u={−1,0,1}.

In the bias compensation equations above, "*" denotes a multiplication operation and "/" denotes a division operation. The compensated values $C_{u,v}$ can then be used to form sub-pel motion estimates with reduced effect of the bias.

Note that the prior discussion related to bias compensation, such as the discussion related to FIGS. 12 and 13, and the accompanying text, discussed the case of positive motion, but the above example also includes the more complete case including negative motion ($x_k<0$ or $y_k<0$). The main difference for negative motion is that the peak decreases with decreasing shift, as opposed to decreasing with increasing shift in the case of positive shift. In general, the compensating function b[x] can be one of: (a) The linear approximation discussed above; (b) The actual curves shown in FIG. 13, or curves quite similar; (c) A function with approximately double the slope of the curves in FIG. 13.

In some embodiments, the amount of compensation is determined according to the correction factors shown in FIGS. 13A-13C. In other embodiments, the correction factors are different than those shown in FIGS. 13A-13C, for example the slopes of the curves are approximately doubled those shown in FIGS. 13A-13C.

By modifying the correlation values in the neighborhood of the correlation peak as described above, the effect of the bias can be minimized to improve the final accuracy of the sub-pel motion estimate. The correlation values are modified prior to performing the sub-pel motion estimation method.

B. Reliability Methods

Figure 3:
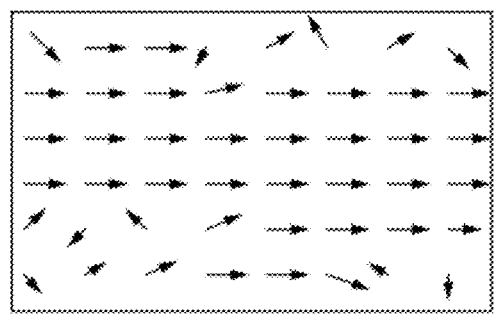
FIG. 3 illustrates an exemplary measured motion field relating two images.
Figure 4:
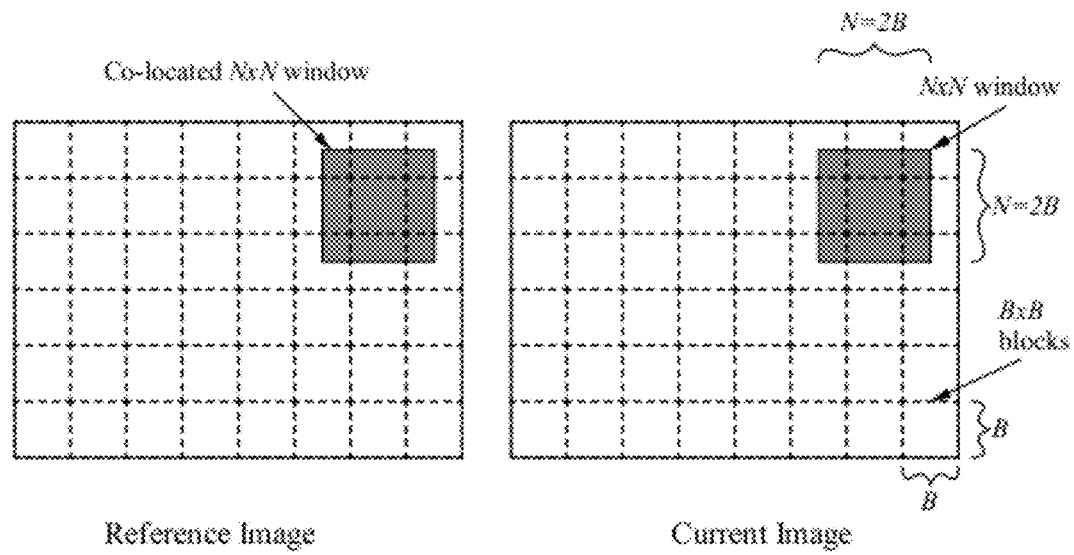
FIG. 4 illustrates an example of applying phase correlation to local blocks of an image pair.
Figure 5:
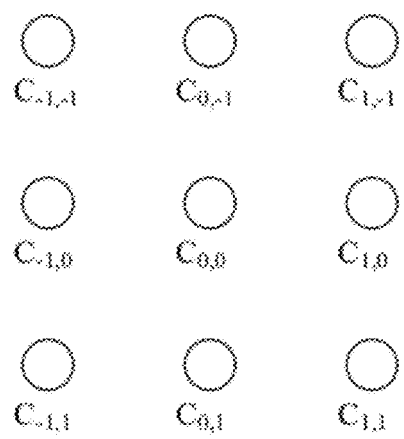
FIG. 5 illustrates notation that is used by the different 2-D sub-pel methods.
Figure 6:
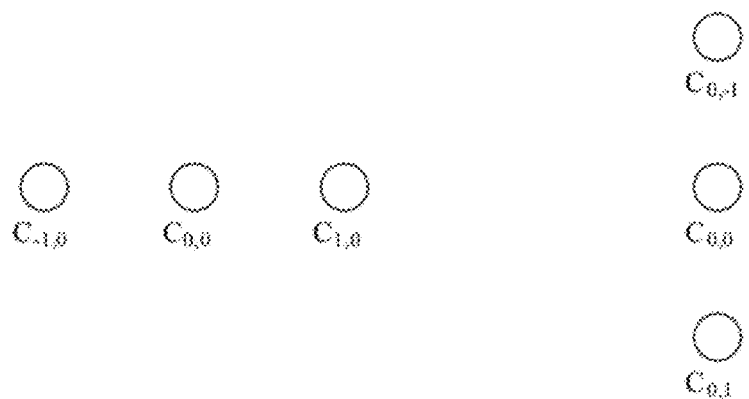
FIG. 6 illustrates notation that is used by the different 1-D sub-pel methods.

To determine the global motion between two images, a global camera model is fit to the individual motion vectors from the different blocks. However, as shown in FIG. 3, some of the local motion vectors can be outliers, completely inappropriate to use to determine the global motion. One of two reliability methods can be used to assign a reliability measure to each of the motion vectors, which can make the overall job of robust model fitting more accurate and efficient. If a particular motion vector is not deemed reliable, that particular motion vector is not used to determine the global motion.

Figure 14:
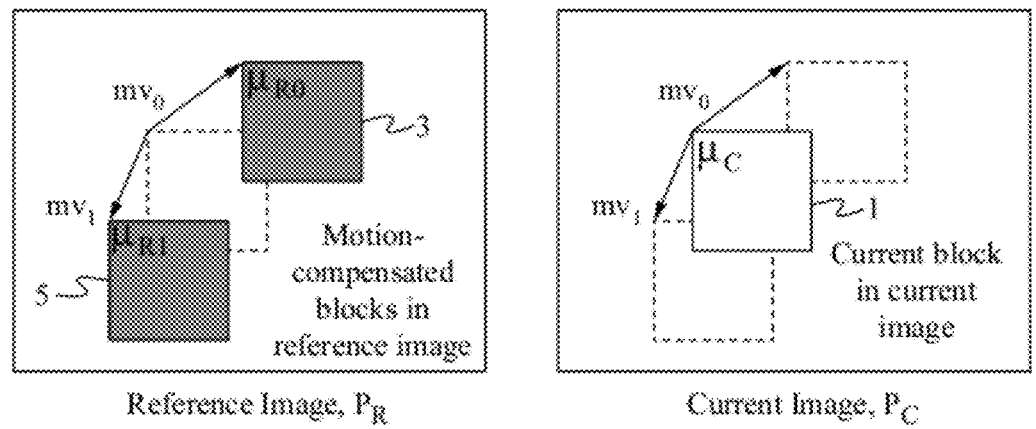
FIG. 14 illustrates an exemplary scenario for measuring reliability.

To estimate reliability of a motion vector, it is assumed that the sub-pel motion estimation method has identified not only the motion vector in question, but also a secondary motion vector which is the method's second-best estimate for the motion of the target block under consideration. FIG. 14 illustrates an exemplary scenario for measuring reliability. The motion vector $mv_0$ is the phase correlation motion estimation, determined according to one of the sub-pel motion estimation methods previously described, corresponding to the largest correlation peak in the phase correlation surface. The motion vector $mv_1$ is the phase correlation motion estimation corresponding to the second-largest correlation peak. The current block 1 in the current image and the motion-shifted blocks 3 and 5 in the reference picture are labeled with their individual block means μ. Specifically, the motion vector $mv_0$ is the motion vector for the current block 1, taken as the motion that results in the biggest correlation peak $s_0$ in the phase correlation surface. In other words, the motion vector $mv_0$ is the motion vector that corresponds to the largest correlation peak. The motion vector $mv_1$ is the secondary motion vector for the current block 1, taken as the motion that results in the second-biggest correlation peak $s_1$ in the phase correlation surface. The correlation peak $s_0$ is the largest correlation peak in the phase correlation surface s[x,y]. The correlation peak $s_1$ is the second largest, or secondary, peak value in the phase correlation surface s[x,y]. The mean value $\mu_C$ is the mean value of the current block 1 in the current image. 'Mean value' refers to the average of the pixel values in the block. The mean value $\mu_{R0}$ is the mean value of the block 3 in the reference image that is offset by motion vector $mv_0$. The mean value $\mu_{R1}$ is the mean value of the block 5 in the reference image that is offset by motion vector $mv_1$.

The reliability measure is applicable for many different variations of model-fitting algorithm. By way of example, a projective eight-parameter model can be used for the motion induced by camera motion. Such a model is a common technique to parameterize camera motion in image and video processing tasks. For fitting the motion vector data to the model, a robust model-fitting technique can be used. One exemplary model-fitting technique is described in "Random Sample Consensus: A Paradigm for Model Fitting with Applications to Image Analysis and Automated Cartography" by M. A. Fischler et al, which is hereby incorporated in its entirety by reference. It is understood that other conventional model-fitting techniques can be used.

A first reliability measure is referred to as a "ratio method" and is defined as follows:

$$reliability_a = 1 - \frac{s_1}{s_0}. \qquad (9)$$

By definition $s_0>s_1$, so that $0 \leq reliability_a \leq 1$. This method assigns reliability based on how much bigger is the primary correlation peak than the secondary correlation peak. A binary decision can be made about the trustworthiness of the candidate motion vector by comparison of the reliability measure with an appropriate threshold. If the reliability measure exceeds the threshold, then the motion vector $mv_0$ is considered reliable and is used in the global motion calculation.

Note that there are trivial manipulations of this "ratio method" that are equivalent to the above measure, but which would simply require a different threshold. For example, a reliability measure equal to the ratio $s_0/s_1$ is equivalent to reliability$_a$ but with a different threshold. This measure is a very low cost estimate of motion vector reliability, which makes use of information already computed during the phase correlation procedure. Since the ratio method inherently makes use of values from the phase correlation surface, the ratio method is only applicable to motion vectors derived by phase correlation.

A second method for assigning motion vector reliability for phase correlation uses a bias-removed Sum of Absolution Difference (SAD). The zero-mean SAD (ZSAD) for a motion vector candidate is defined as:

$$ZSAD = (mv = \{mv_x, mv_y\}) = \sum_{x,y} |P_C(x, y) - P_R(x + mv_x, y + mv_y) + \mu_R - \mu_C|, \quad (10)$$

where $\mu_R$ and $\mu_C$ are the means of the blocks in the reference image and current image, respectively. The notation ZSAD (mv) indicates that ZSAD is a function of the input motion vector, $mv=\{mv_x, mv_y\}$. $P_C(x,y)$ refers to the pixel value of the pixel located at position (x,y) in the current image, and $P_R(x+mv_x, y+mv_y)$ refers to the pixel value of the same pixel motion-shifted by $mv_x$ and $mv_y$ in the reference image. Phase correlation has innate robustness to lighting changes, and reliability$_a$ is not affected by such perturbations. Including the block means $\mu_R$ and $\mu_C$ in ZSAD helps to prevent lighting changes from affecting the reliability$_b$ measure defined below in equation (11). The block means $\mu_R$ and $\mu_C$ can be calculated explicitly in the spatial domain, or can be approximated using the DC terms of the Fourier transforms, which are already available when using phase correlation.

The reliability measure is then defined as follows:

$$\text{reliability}_b = ZSAD(mv_1) - ZSAD(mv_0). \quad (11)$$

A reliability threshold is defined whereby if the reliability measure exceeds the reliability threshold, the motion vector $mv_0$ is considered reliable and is used in the global motion calculation. For applications where lighting changes are not expected, the ZSAD measure above can be replaced with a traditional SAD measure to reduce complexity. This measure of reliability is applicable not only to phase correlation motion estimation algorithms, but to other local motion estimation algorithms as well. In such cases, the top two candidates from the alternate motion estimation algorithm are considered instead of the top two phase correlation candidates.

In general the reliability method determines a contrast between the first choice motion estimation, the motion vector $mv_0$, and the second choice motion estimation, the motion vector $mv_1$. If there is a good contrast, as measured by a threshold, then the first choice motion estimation is deemed reliable.

The sub-pel motion estimation methods and the reliability methods can be included as part of an image alignment method. The image alignment method utilizes the determined global motion to align the images for which the global motion was determined. The sub-pel motion estimation methods and the reliability methods can be implemented within a conventional imaging system including, but not limited to, consumer cameras and video cameras, industrial machine vision, medical imaging, and surveillance systems.

Figure 15:
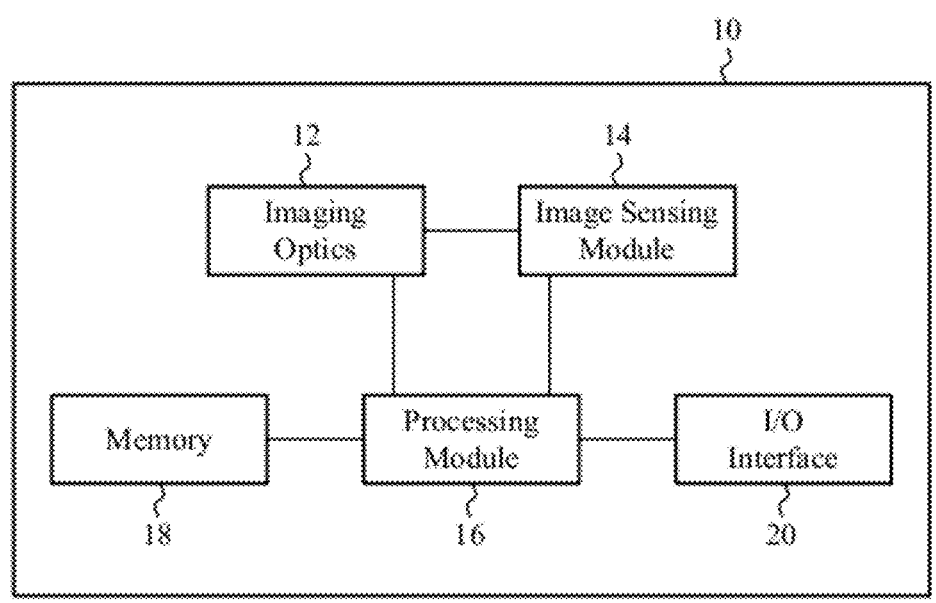
FIG. 15 illustrates a block diagram of an exemplary imaging system configured to implement the sub-pel motion estimation methods and the reliability methods.

FIG. 15 illustrates a block diagram of an exemplary imaging system configured to implement the sub-pel motion estimation methods and the reliability methods. The imaging system 10 is any device capable of capturing and/or processing an image or video sequence. The imaging system 10 includes imaging optics 12, an image sensing module 14, a processing module 16, a memory 18, and an input/output (I/O) interface 20. The imaging optics 12 include any conventional optics to receive an input light representative of an image to be captured, to filter the input light, and to direct the filtered light to the image sensing module 14. Alternatively, the imaging optics 12 do not filter the input light. The image sensing module 14 includes one or more sensing elements to detect the filtered light. Alternatively, the image sensing module 14 includes a color filter array to filter the input light and one or more sensing elements to detect the light filtered by the color filter array. In one embodiment, the image sensing module 14 consists of a single-chip image sensor. In an alternative embodiment, the image sensing module 14 consists of a multiple-chip image sensor.

The memory 18 can include both fixed and removable media using any one or more of magnetic, optical or magneto-optical storage technology or any other available mass storage technology. The processing module 16 is configured to control the operation of the imaging system 10. The processing module 16 is also configured to utilize the sub-pel motion estimation methods, the reliability methods, and the image alignment method described above. These methods are stored as program instructions and data within the memory 18. The I/O interface 20 includes a user interface and a network interface. The user interface can include a display to show user instructions, feedback related to input user commands, and/or the images captured and processed by the imaging optics 12, the image sensing module 14, and the processing module 16. The network interface 20 includes a physical interface circuit for sending and receiving imaging data and control communications over a conventional network.

Some Embodiments of a Method for Highly Accurate Estimation of Motion Using Phase Correlation 1. An image alignment method comprising:
   a. storing a reference image and a current image in a memory, wherein the reference image is defined by a first set of local pixel blocks and the current image is defined by a second set of local pixel blocks;
   b. applying phase correlation to a first block in the reference image and a first block in the current image to generate a phase correlation surface between the first block of the reference image and the first block of the current image, wherein the phase correlation surface is defined by a set of correlation points each having a correlation value;
   c. filtering the phase correlation surface using a filter that is fit by a first quadratic surface, thereby forming a filtered phase correlation surface having a filtered set of correlation points;
   d. determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and e. determining a global motion between the reference image and the current image by fitting a set of motion vectors corresponding to the second set of blocks in the current image to a global motion model.

2. The method of clause 1 wherein determining the sub-pel motion estimation comprises applying a five-parameter quadratic fit method, wherein the five parameters are derived from the correlation values corresponding to the peak correlation point and the neighborhood of four correlation points about the peak correlation point.

3. The method of clause 1 wherein determining the sub-pel motion estimation comprises applying a six-parameter quadratic fit method, wherein the six parameters are derived from the correlation values corresponding to the peak correlation point and the neighborhood of five correlation points about the peak correlation point.

4. The method of clause 1 wherein determining the sub-pel motion estimation comprises applying a six-parameter least squares quadratic fit method, wherein the six parameters are derived from a least squares fit of the correlation values corresponding to the peak correlation point and the neighborhood of eight correlation points about the peak correlation point.

5. The method of clause 1 wherein the filter is a spatial-domain filter.

6. The method of clause 1 wherein the filter is a frequency-domain filter.

7. The method of clause 1 wherein the first quadratic surface is defined by $p[x,y]=1-\frac{1}{3}x^2-\frac{1}{3}y^2$, where $x,y=-1,0,1$.

8. The method of clause 1 further comprising modifying the sub-set of correlation values prior to determining the sub-pel motion estimation in order to compensate for bias.

9. The method of clause 1 further comprising determining a motion vector for each block in the current image.

10. The method of clause 1 further comprising determining a reliability value of the motion vector.

11. The method of clause 10 wherein if the reliability value is less than a threshold value, the motion vector is removed from the set of motion vectors used in determining the global motion.

12. The method of clause 10 wherein each motion vector in the set of motion vectors is weighted according to the reliability value, thereby forming a weighted set of motion vectors used to determine the global motion.

13. The method of clause 10 wherein the reliability value is determined by contrasting the largest peak correlation value to a second-largest peak correlation value of the filtered set of correlation values.

14. The method of clause 10 further comprising determining a second motion vector for each block, wherein the second motion vector corresponds to a second-largest peak correlation value of the filtered set of correlation points, further wherein the reliability value is determined by contrasting a zero-mean sum of absolute difference of the motion vector to a zero-mean sum of absolute difference of the second motion vector.

15. The method of clause 10 wherein the reliability value is determined by contrasting the largest peak correlation value to a second-largest peak correlation value of the set of correlation values.

16. The method of clause 10 further comprising determining a second motion vector for each block, wherein the second motion vector corresponds to a second-largest peak correlation value of the set of correlation points, further wherein the reliability value is determined by contrasting a zero-mean sum of absolute difference of the motion vector to a zero-mean sum of absolute difference of the second motion vector.

17. The method of clause 1 wherein the largest peak correlation point has a largest value of the filtered set of correlation points of the filtered phase correlation surface.

18. The method of clause 1 wherein the largest peak correlation point has a largest value of the set of correlation points of the phase correlation surface.

19. A system for aligning images, the system comprising:

a. a memory for storing a current image and a reference image, wherein the reference image is defined by a first set of local pixel blocks and the current image is defined by a second set of local pixel blocks; and b. a program for i. applying phase correlation to a first block in the reference image and a first block in the current image to generate a phase correlation surface between the first block of the reference image and the first block of the current image, wherein the phase correlation surface is defined by a set of correlation points each having a correlation value;

ii. filtering the phase correlation surface using a filter that is fit by a first quadratic surface, thereby forming a filtered phase correlation surface having a filtered set of correlation points;

iii. determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and iv. determining a global motion between the reference image and the current image by fitting a set of motion vectors corresponding to the second set of blocks in the current image to a global motion model.

20. The system of clause 19 wherein the program includes a five-parameter quadratic fit method to determine the sub-pel motion estimation, wherein the five parameters are derived from the correlation values corresponding to the peak correlation point and the neighborhood of four correlation points about the peak correlation point.

21. The system of clause 19 wherein the program includes a six-parameter quadratic fit method to determine the sub-pel motion estimation, wherein the six parameters are derived from the correlation values corresponding to the peak correlation point and the neighborhood of five correlation points about the peak correlation point.

22. The system of clause 19 wherein the program includes a six-parameter least squares quadratic fit method to determine the sub-pel motion estimation, wherein the six parameters are derived from a least squares fit of the correlation values corresponding to the peak correlation point and the neighborhood of eight correlation points about the peak correlation point.

23. The system of clause 19 wherein the filter is a spatial-domain filter.

24. The system of clause 19 wherein the filter is a frequency-domain filter.

25. The system of clause 19 wherein the first quadratic surface is defined by $p[x,y]=1-\frac{1}{3}x^2-\frac{1}{3}y^2$, where $x,y=-1,0,1$.

26. The system of clause 19 wherein the program is further configured for modifying the sub-set of correlation values prior to determining the sub-pel motion estimation in order to compensate for bias.

27. The system of clause 19 wherein the program is further configured for determining a motion vector for each block in the current image.

28. The system of clause 19 wherein the program is further configured for determining a reliability value of the motion vector.

29. The system of clause 28 wherein if the reliability value is less than a threshold value, the motion vector is removed from the set of motion vectors used in determining the global motion.

30. The system of clause 28 wherein each motion vector in the set of motion vectors is weighted according to the reliability value, thereby forming a weighted set of motion vectors used to determine the global motion.

31. The system of clause 28 wherein the reliability value is determined by contrasting the largest peak correlation value to a second-largest peak correlation value of the filtered set of correlation values.

32. The system of clause 28 wherein the program is further configured for determining a second motion vector for each block, wherein the second motion vector corresponds to a second-largest peak correlation value of the filtered set of correlation points, further wherein the reliability value is determined by contrasting a zero-mean sum of absolute difference of the motion vector to a zero-mean sum of absolute difference of the second motion vector.

33. The system of clause 28 wherein the reliability value is determined by contrasting the largest peak correlation value to a second-largest peak correlation value of the set of correlation values.

34. The system of clause 28 wherein the program is further configured for determining a second motion vector for each block, wherein the second motion vector corresponds to a second-largest peak correlation value of the set of correlation points, further wherein the reliability value is determined by contrasting a zero-mean sum of absolute difference of the motion vector to a zero-mean sum of absolute difference of the second motion vector.

35. The system of clause 19 wherein the largest peak correlation point has a largest value of the filtered set of correlation points of the filtered phase correlation surface.

36. The system of clause 19 wherein the largest peak correlation point has a largest value of the set of correlation points of the phase correlation surface.

The image alignment method has been described in terms of specific embodiments incorporating details to facilitate the understanding of the principles of construction and operation of the motion estimation method. Such references, herein, to specific embodiments and details thereof are not intended to limit the scope of the claims appended hereto. It will be apparent to those skilled in the art that modifications can be made in the embodiments chosen for illustration without departing from the spirit and scope of the methods.

What is claimed is:

1. An image alignment method comprising:
   a. storing a reference image and a current image in a memory, wherein the reference image is defined by a first set of local pixel blocks and the current image is defined by a second set of local pixel blocks;
   b. applying phase correlation to a first block in the reference image and a first block in the current image to generate a phase correlation surface between the first block of the reference image and the first block of the current image, wherein the phase correlation surface is defined by a set of correlation points each having a correlation value;
   c. filtering the phase correlation surface using a filter that is fit by a first quadratic surface, thereby forming a filtered phase correlation surface having a filtered set of correlation points;
   d. determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and
   e. determining a global motion between the reference image and the current image by fitting a set of motion vectors corresponding to the second set of blocks in the current image to a global motion model.

2. The method of claim 1 wherein determining the sub-pel motion estimation comprises applying a five-parameter quadratic fit method, wherein the five parameters are derived from the correlation values corresponding to the peak correlation point and the neighborhood of four correlation points about the peak correlation point.

3. The method of claim 1 wherein determining the sub-pel motion estimation comprises applying a six-parameter quadratic fit method, wherein the six parameters are derived from the correlation values corresponding to the peak correlation point and the neighborhood of five correlation points about the peak correlation point.

4. The method of claim 1 wherein determining the sub-pel motion estimation comprises applying a six-parameter least squares quadratic fit method, wherein the six parameters are derived from a least squares fit of the correlation values corresponding to the peak correlation point and the neighborhood of eight correlation points about the peak correlation point.

5. The method of claim 1 wherein the filter is a spatial-domain filter.

6. The method of claim 1 wherein the filter is a frequency-domain filter.

7. The method of claim 1 wherein the first quadratic surface is defined by $p[x,y]=1-\frac{1}{3}x^2-\frac{1}{3}y^2$, where $x,y=-1,0,1$.

8. The method of claim 1 further comprising modifying the sub-set of correlation values prior to determining the sub-pel motion estimation in order to compensate for bias.

9. The method of claim 1 further comprising determining a motion vector for each block in the current image.

10. The method of claim 1 further comprising determining a reliability value of the motion vector.

11. The method of claim 10 wherein if the reliability value is less than a threshold value, the motion vector is removed from the set of motion vectors used in determining the global motion.

12. The method of claim 10 wherein each motion vector in the set of motion vectors is weighted according to the reliability value, thereby forming a weighted set of motion vectors used to determine the global motion.

13. The method of claim 10 wherein the reliability value is determined by contrasting the largest peak correlation value to a second-largest peak correlation value of the filtered set of correlation values.

14. The method of claim 10 further comprising determining a second motion vector for each block, wherein the second motion vector corresponds to a second-largest peak correlation value of the filtered set of correlation points, further wherein the reliability value is determined by contrasting a zero-mean sum of absolute difference of the motion vector to a zero-mean sum of absolute difference of the second motion vector.

15. The method of claim 10 wherein the reliability value is determined by contrasting the largest peak correlation value to a second-largest peak correlation value of the set of correlation values.

16. The method of claim 10 further comprising determining a second motion vector for each block, wherein the second motion vector corresponds to a second-largest peak correlation value of the set of correlation points, further wherein the reliability value is determined by contrasting a zero-mean sum of absolute difference of the motion vector to a zero-mean sum of absolute difference of the second motion vector.

17. The method of claim 1 wherein the largest peak correlation point has a largest value of the filtered set of correlation points of the filtered phase correlation surface.

18. The method of claim 1 wherein the largest peak correlation point has a largest value of the set of correlation points of the phase correlation surface.

19. A system for aligning images, the system comprising:
  a. a memory for storing a current image and a reference image, wherein the reference image is defined by a first set of local pixel blocks and the current image is defined by a second set of local pixel blocks; and
  b. a program for
    i. applying phase correlation to a first block in the reference image and a first block in the current image to generate a phase correlation surface between the first block of the reference image and the first block of the current image, wherein the phase correlation surface is defined by a set of correlation points each having a correlation value;
    ii. filtering the phase correlation surface using a filter that is fit by a first quadratic surface, thereby forming a filtered phase correlation surface having a filtered set of correlation points;
    iii. determining a sub-pel motion estimation according to a second quadratic surface and a sub-set of correlation values of the filtered set of correlation points and a largest peak correlation point, wherein the sub-set of correlation values correspond to a neighborhood of correlation points about the largest peak correlation point, thereby determining a motion vector corresponding to the first block in the current image; and
    iv. determining a global motion between the reference image and the current image by fitting a set of motion vectors corresponding to the second set of blocks in the current image to a global motion model.

20. The system of claim 19 wherein the program includes a five-parameter quadratic fit method to determine the sub-pel motion estimation, wherein the five parameters are derived from the correlation values corresponding to the peak correlation point and the neighborhood of four correlation points about the peak correlation point.

21. The system of claim 19 wherein the program includes a six-parameter quadratic fit method to determine the sub-pel motion estimation, wherein the six parameters are derived from the correlation values corresponding to the peak correlation point and the neighborhood of five correlation points about the peak correlation point.

22. The system of claim 19 wherein the program includes a six-parameter least squares quadratic fit method to determine the sub-pel motion estimation, wherein the six parameters are derived from a least squares fit of the correlation values corresponding to the peak correlation point and the neighborhood of eight correlation points about the peak correlation point.

23. The system of claim 19 wherein the filter is a spatial-domain filter.

24. The system of claim 19 wherein the filter is a frequency-domain filter.

25. The system of claim 19 wherein the first quadratic surface is defined by $p[x,y]=1-\frac{1}{3}x^2-\frac{1}{3}y^2$, where $x,y=-1,0,1$.

26. The system of claim 19 wherein the program is further configured for modifying the sub-set of correlation values prior to determining the sub-pel motion estimation in order to compensate for bias.

27. The system of claim 19 wherein the program is further configured for determining a motion vector for each block in the current image.

28. The system of claim 19 wherein the program is further configured for determining a reliability value of the motion vector.

29. The system of claim 28 wherein if the reliability value is less than a threshold value, the motion vector is removed from the set of motion vectors used in determining the global motion.

30. The system of claim 28 wherein each motion vector in the set of motion vectors is weighted according to the reliability value, thereby forming a weighted set of motion vectors used to determine the global motion.

31. The system of claim 28 wherein the reliability value is determined by contrasting the largest peak correlation value to a second-largest peak correlation value of the filtered set of correlation values.

32. The system of claim 28 wherein the program is further configured for determining a second motion vector for each block, wherein the second motion vector corresponds to a second-largest peak correlation value of the filtered set of correlation points, further wherein the reliability value is determined by contrasting a zero-mean sum of absolute difference of the motion vector to a zero-mean sum of absolute difference of the second motion vector.

33. The system of claim 28 wherein the reliability value is determined by contrasting the largest peak correlation value to a second-largest peak correlation value of the set of correlation values.

34. The system of claim 28 wherein the program is further configured for determining a second motion vector for each block, wherein the second motion vector corresponds to a second-largest peak correlation value of the set of correlation points, further wherein the reliability value is determined by contrasting a zero-mean sum of absolute difference of the motion vector to a zero-mean sum of absolute difference of the second motion vector.

35. The system of claim 19 wherein the largest peak correlation point has a largest value of the filtered set of correlation points of the filtered phase correlation surface.

36. The system of claim 19 wherein the largest peak correlation point has a largest value of the set of correlation points of the phase correlation surface.

* * * * *